United States Patent
Tseng

(10) Patent No.: US 12,025,839 B2
(45) Date of Patent: Jul. 2, 2024

(54) CRIMPING DEVICE AND CRIMPING METHOD FOR REINFORCED FIBERS

(71) Applicant: ACSUPER TECHNOLOGIES INC., Miaoli County (TW)

(72) Inventor: Chung-Ming Tseng, Miaoli County (TW)

(73) Assignee: ACSUPER TECHNOLOGIES INC., Miaoli County (TW)

( * ) Notice: Subject to any disclaimer, the term of this patent is extended or adjusted under 35 U.S.C. 154(b) by 111 days.

(21) Appl. No.: 17/854,132

(22) Filed: Jun. 30, 2022

(65) Prior Publication Data

US 2023/0064271 A1  Mar. 2, 2023

Related U.S. Application Data

(60) Provisional application No. 63/232,700, filed on Aug. 13, 2021.

(51) Int. Cl.
*G02B 6/38* (2006.01)

(52) U.S. Cl.
CPC ......... *G02B 6/3857* (2013.01); *G02B 6/3869* (2013.01); *G02B 6/3887* (2013.01); *G02B 6/3898* (2013.01)

(58) Field of Classification Search
CPC .................................................... G02B 6/3857
See application file for complete search history.

(56) References Cited

U.S. PATENT DOCUMENTS

| | | | |
|---|---|---|---|
| 7,431,515 B1 * | 10/2008 | Penumatcha ........ | G02B 6/3855 385/86 |
| 8,646,989 B2 * | 2/2014 | Zimmel ............... | G02B 6/3885 385/81 |
| 9,618,703 B2 | 4/2017 | Tizumi et al. | |
| 2020/0408998 A1 * | 12/2020 | Iizumi .................. | G02B 6/3857 |

FOREIGN PATENT DOCUMENTS

TW     201520628 A     6/2015

* cited by examiner

*Primary Examiner* — Eric Wong
(74) *Attorney, Agent, or Firm* — WPAT, P.C

(57) ABSTRACT

A crimping method includes covering an outer periphery of the back post is with reinforced fibers. The reinforced fibers are crimped to a front section of a back post. The reinforced fibers are twisted in a circumferential direction of the back post, such that the reinforced fibers extend on the outer periphery of the back post in a non-axial direction. The twisted reinforced fibers are crimped to a rear section of the back post. A crimping device includes a connector including a back post having at least one guiding rib with at least one notch. At least one crimp sleeve is used to crimp reinforced fibers of an optical fiber cable to the back post, and a portion of the reinforced fibers is gathered in the at least one notch.

14 Claims, 6 Drawing Sheets

CRIMPING DEVICE AND CRIMPING METHOD FOR REINFORCED FIBERS

CROSS REFERENCE TO RELATED APPLICATIONS

The application claims the benefit of U.S. provisional application No. 63/232,700, filed on Aug. 13, 2021, the subject matter of which is incorporated herein by reference.

BACKGROUND OF THE INVENTION

1. Field of the Invention

The present invention relates to a crimping device and a crimping method for fibers and, more particularly, to a crimping device and a crimping method for reinforced fibers for an optical fiber cable.

2. Description of the Related Art

Optical fiber communication has advantages of long transmission distance, large data volume communication, excellent anti-interference effect, etc. Due to the increase in the demand in the frequency bands for networks, optical fiber communication has become the principal method in wired communication. During installation of an optical communication line, two ends respectively of two optical fibers are connected or an optical fiber is connected to a device. To rapidly and conveniently finish the connection of optical fibers, an optical fiber cable is usually coupled to an optical fiber connector before connection. Furthermore, to assure a good communication quality of the optical communication line, several factors, including the tensile strength, affecting the stability and reliability must be considered for connection between the optical fiber connector and the optical fiber cable. Thus, reinforced fibers are generally added into an optical fiber cable to increase the tensile strength.

FIG. 1 shows a conventional crimping device 9 for reinforced fibers. The crimping device 9 includes an optical fiber connector 91 and a crimp sleeve 92 for coupling an optical fiber cable Y with the optical fiber connector 91. Specifically, the optical fiber cable Y includes an optical fiber W located in a space surrounded by a plurality of reinforced fibers F. The optical fiber connector 91 includes a back post 93 having a plurality of annular protrusions 94 on an outer periphery thereof. The optical fiber W extends into the back post 93. The plurality of reinforced fibers F is stretched open and disposed around the back post 93. The plurality of reinforced fibers F envelops the plurality of protrusions 94. A crimping pressure is applied to the crimp sleeve 92 to crimp the plurality of reinforced fibers F on the back post 93 from outside, such that the optical fiber cable Y and the optical fiber connector 91 couple with each other. An axial tensile force between the optical fiber cable Y and the optical fiber connector 91 can be resisted by crimping the plurality of twisted reinforced fibers F. An example of such a conventional crimping device 9 for reinforced fibers is disclosed in Taiwan Patent Publication No. 201520628.

With the popularization of optical communication, the amount and length of optical fiber lines are increased whereas the factors affecting the installation environment becomes more and more diversified. Therefore, the pulling force caused by the weight and strong wind and acting on the optical fiber cable Y and the optical fiber connector 91 is more severe than ever. However, in use of the conventional crimping device 9 for reinforced fibers, since the plurality of reinforced fibers F is crimped in a direction parallel to the axial direction of the optical fiber connector 91, the plurality of reinforced fibers F can only withstand an axial tensile force smaller than 196 N. Thus, in a poor installation environment, breakage of the crimp sleeve 92 and slippage of the plurality of reinforced fibers F often occur. To assure the stability and reliability of the optical fiber communication line, the plurality of reinforced fibers F must be crimped more securely, such that the coupling between the optical fiber cable Y and the optical fiber connector 91 can withstand a larger axial tensile force.

Thus, improvement to the conventional crimping device and the conventional crimping method for reinforced fibers for mitigating and/or obviating the above drawbacks is required.

SUMMARY OF THE INVENTION

To solve the above drawbacks, it is an objective of the present invention to provide a crimping method for reinforced fibers, such that the coupling between the optical fiber cable and the optical fiber connector can withstand a larger axial tensile force.

It is another objective of the present invention to provide a crimping device for reinforced fibers for more securely crimping the reinforced fibers.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

As used herein, the term "one", "a" or "an" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling", "engagement", "assembly", or similar terms is used to include separation of connected members without destroying the members after connection or inseparable connection of the members after connection. A person having ordinary skill in the art would be able to select according to desired demands in the material or assembly of the members to be connected.

A crimping method for reinforced fibers according to the present invention includes providing an optical fiber cable and a connector. The optical fiber cable includes a plurality of reinforced fibers. The connector includes a back post. An outer periphery of the back post is covered with the plurality of reinforced fibers. The plurality of reinforced fibers is crimped to a front section of the back post. The plurality of reinforced fibers is twisted in a circumferential direction of the back post, such that the plurality of reinforced fibers extends on the outer periphery of the back post in a non-axial direction. The plurality of twisted reinforced fibers is crimped to a rear section of the back post.

A crimping device for reinforced fibers according to the present invention includes a connector including a back post on an end thereof. The back post includes an outer periphery having at least one guiding rib. At least one notch is located in the at least one guiding rib. At least one crimp sleeve is disposed around the back post and covers the at least one notch. The at least one crimp sleeve is configured to crimp a plurality of reinforced fibers of an optical fiber cable to the back post. A portion of the plurality of reinforced fibers is gathered in the at least one notch.

Thus, by using the crimping device and the crimping method for reinforced fibers according to the present invention, the plurality of reinforced fibers can extend non-axially on the outer periphery of the back post, and a portion of the plurality of reinforced fibers can be gathered in the at least one notch to provide more secure crimping. Thus, the axial tensile force acting on the connector and the optical fiber cable can be effectively distributed, thereby increasing the withstanding capacity of the axial tensile force between the connector and the optical fiber cable. It is worth noting that the crimping method for reinforced fibers according to the present invention can be carried out by devices other than the above crimping device. Namely, other equivalent structures can be used to carry out the crimping method.

In an example, the plurality of reinforced fibers is twisted 90° in the circumferential direction of the back post. Thus, with provision of the back post with a limited length, the plurality of reinforced fibers can extend in a non-axial direction, which is a preferred arrangement of angular distribution of the axial tensile force.

In an example, the outer periphery of the back post includes at least one guiding rib. At least one notch is located in the at least one guiding rib. A portion of the plurality of reinforced fibers is gathered in the at least one notch. Thus, the at least one notch can guide the plurality of reinforced fibers to permit easy twisting of the plurality of reinforced fibers.

In an example, the at least one guiding rib includes a plurality of guiding ribs. The at least one notch includes a plurality of notches located in the plurality of guiding ribs. Two of the plurality of notches are located in two different guiding ribs and are misaligned from each other in an axial direction of the back post. Thus, the plurality of reinforced fibers can extend in a non-axial direction.

In an example, the two of the plurality of notches located in the two different guiding ribs are spaced from each other by 90° in the circumferential direction of the back post. Thus, the plurality of reinforced fibers can extend 90° in the circumferential direction of the back post, permitting easy twisting of the plurality of reinforced fibers.

In an example, the at least one crimp sleeve includes two crimp sleeves. One of the two of the plurality of notches in one of the two different guiding ribs is covered by one of the two crimp sleeves. Another of the two of the plurality of notches in another of the two different guiding ribs is covered by another of the two crimp sleeves. Thus, the two crimp sleeves can crimp the plurality of reinforced fibers before twisting and the plurality of reinforced fibers after twisting, respectively, permitting easy installation.

In an example, one of the plurality of guiding ribs most distant to a free end of the back post has a width larger than a width of each of remaining guiding ribs. Thus, the crimping area of the at least one crimp sleeve is increased to increase the frictional force for securing the plurality of reinforced fibers.

In an example, the at least one guiding rib includes two notches opposite to each other in a diametric direction of the back post. Thus, the plurality of reinforced fibers can be symmetrically gathered in the two notches of the at least one guiding rib, thereby symmetrically distributing the axial tensile force.

In an example, the outer periphery of the back post is smooth and free of protrusions between a free end of the back post and the at least one guiding rib nearest to the free end of the back post. Thus, the plurality of reinforced fibers can extend without interference, reducing the possibility of breakage of the plurality of reinforced fibers.

In an example, the back post includes at least one positioning rib protruding outward from a section of the outer periphery of the back post to form a closed shape enclosing the section correspondingly. Thus, the at least one crimp sleeve can secure the plurality of reinforced fibers to the at least one positioning rib, avoiding disengagement of the plurality of reinforced fibers.

In an example, the at least one positioning rib includes a plurality of positioning ribs. Each two adjacent positioning ribs have a respective guiding rib therebetween. Thus, the two crimp sleeves can crimp the plurality of reinforced fibers before twisting and the plurality of reinforced fibers after twisting, respectively, securing the twisted position of the plurality of the reinforced fibers.

In an example, the outer periphery of the back post is smooth and free of protrusions between a free end of the back post and the at least one positioning rib nearest to the free end of the back post. Thus, the plurality of reinforced fibers can extend without interference, reducing the possibility of breakage of the plurality of reinforced fibers.

In an example, the back post includes a stop rib contiguous to a free end of the back post. The at least one crimp sleeve is stopped by the stop rib after crimping the plurality of reinforced fibers. Thus, the at least one crimp sleeve is prevented from falling off from the free end of the back post.

In an example, the stop rib includes a notch aligned with the at least one notch of the at least one guiding rib nearest to the stop rib in an axial direction of the back post. Thus, the plurality of reinforced fibers in the notch in the guiding rib can extend into the notch of the stop rib, avoiding the need to withstand the shear force caused by the at least one crimp sleeve and the stop rib to thereby avoid breakage of the plurality of reinforced fibers.

In an example, the outer periphery of the back post includes at least one protrusion connected to a free end of the back post. The at least one protrusion partially surrounds the outer periphery of the back post. The at least one crimp sleeve is stopped by the protrusion after crimping the plurality of reinforced fibers. Thus, the at least one crimp sleeve is prevented from falling off from the free end of the back post.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
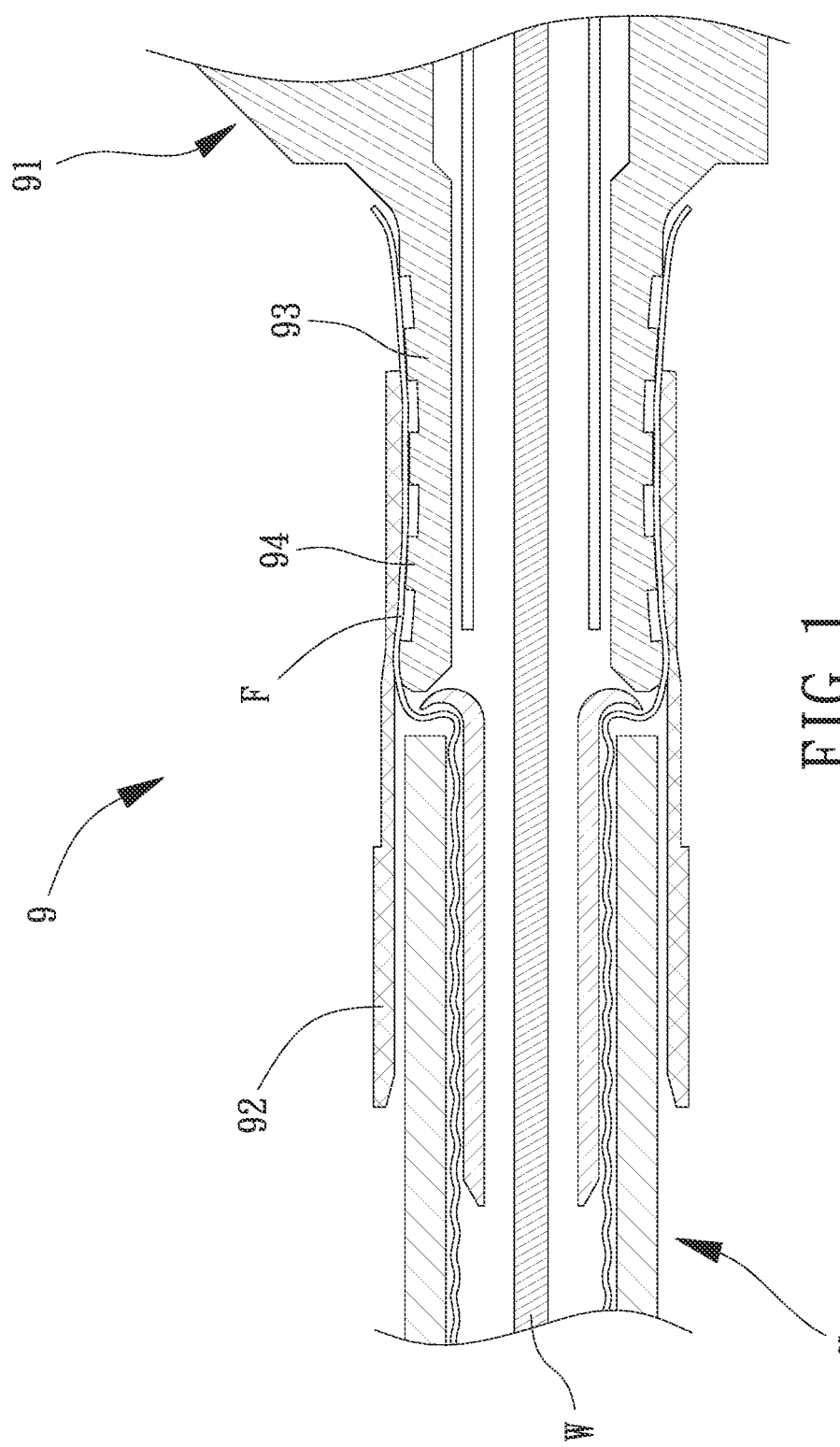
FIG. 1 is a diagrammatic cross sectional view of a conventional crimping device for reinforced fibers.
Figure 2:
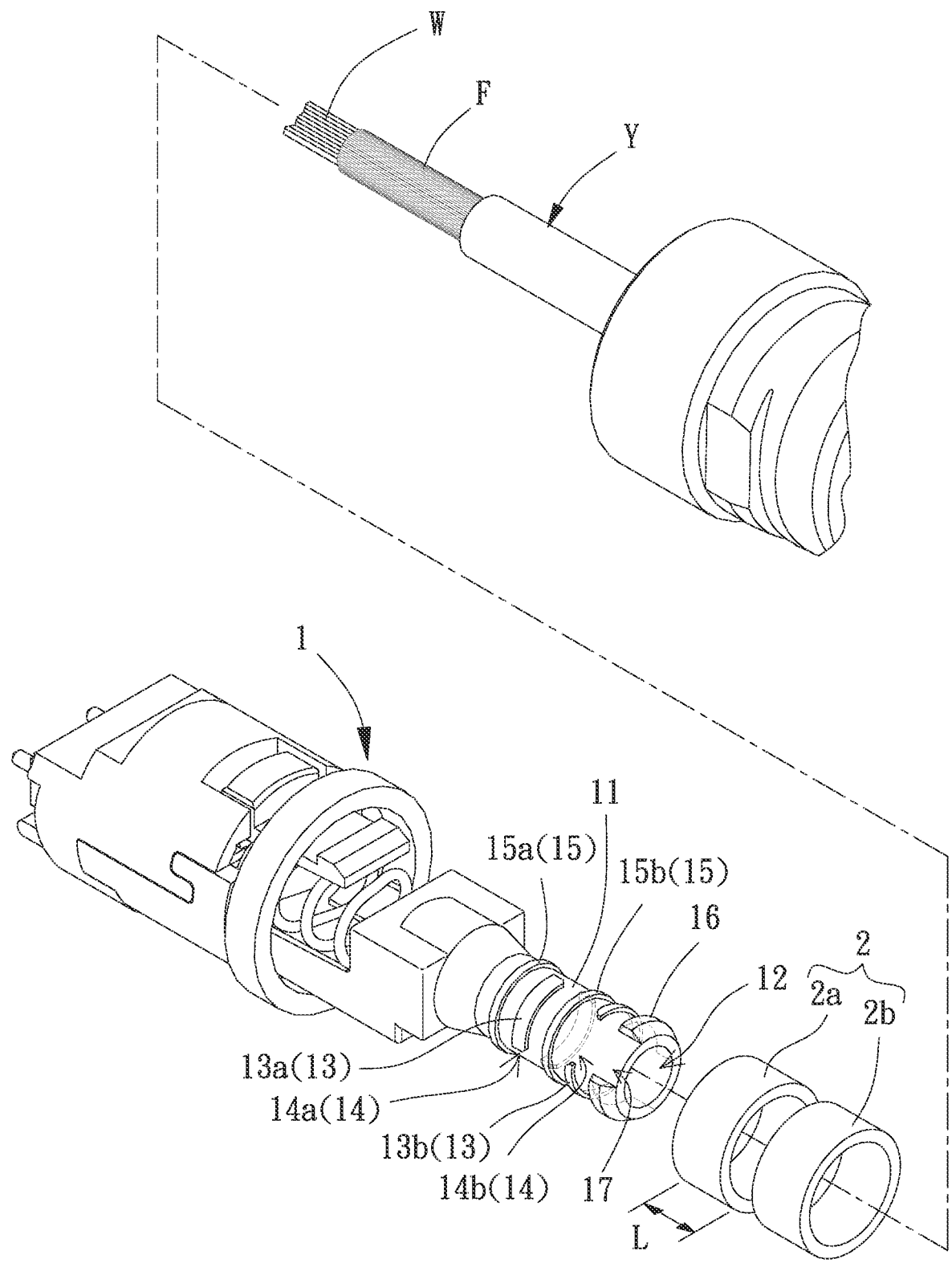
FIG. 2 is an exploded, perspective view of a crimping device of a preferred embodiment according to the present invention.

With reference to FIG. 2, a crimping device for reinforced fibers of a preferred embodiment according to the present invention includes a connector 1 and at least one crimp sleeve 2 surrounding an end of the connector 1.

The connector 1 can be any conventional optical connector, such as a straight tip (ST) connector, a Lucent connector, a fiber distributed data interface (FDDI) connector, a Ferrule connector (FC), or a subscriber connector (SC). The present invention is not limited in this regard. The connector 1 can have various structures due to various types, which can be appreciated by one having ordinary skill in the art, and redundant description is not set forth herein. The present invention is only described with respect to the structure for crimping reinforced fibers. The connector 1 includes a back post 11 on an end thereof. The back post 11 is a tubular member and includes a through-hole 12 intercommunicating with an interior space of the connector 1. The back post 11 includes an outer periphery having at least one guiding rib 13, and at least one notch 14 is located in the at least one guiding rib 13.

More specifically, in this embodiment, the back post 11 is a component of the connector 1. The number of the at least one guiding rib 13 can be two. Two notches 14 are located on two different guiding ribs 13 and are misaligned from each other in an axial direction of the back post 11. Furthermore, each of the two guiding ribs 13 may include two notches 14 that are opposite to each other in a diametric direction of the back post 11. For ease of explanation, the two guiding ribs 13 are referred to as "guiding rib 13a" and "guiding rib 13b", respectively. The guiding rib 13b is nearer to the free end of the back post 11 than the guiding rib 13a. The guiding rib 13a may include two notches 14a which are opposite to each other in the diametric direction of the back post 11. The guiding rib 13b may also include two notches 14b which are opposite to each other in the diametric direction of the back post 11. Furthermore, the two notches 14 on different guiding ribs 13 and misaligned from each other can be spaced from each other by 90° in the circumferential direction of the back post 11. As shown in this embodiment, the two notches 14a on the guiding rib 13a can be spaced from the two notches 14b on the guiding rib 13b by 90° in the circumferential direction of the back post 11. Furthermore, the outer periphery of the back post 11 is smooth and free of protrusions between the free end of the back post 11 and one of the guiding ribs 13 nearest to the free end of the back post 11.

The back post 11 may further include at least one positioning rib 15 that is free of notches to completely surround a section of the outer periphery of the back post 11. In this embodiment, the back post 11 includes a plurality of positioning ribs 15, such as two positioning ribs 15, and the two positioning ribs 15 are referred to as "positioning rib 15a" and "positioning rib 15b", respectively. The two positioning ribs 15a and 15b and the two guiding ribs 13a and 13b are alternately disposed. Thus, each two adjacent positioning ribs 15a, 15b have a respective guiding rib 13 therebetween. Furthermore, the back post 11 may further include a stop rib 16 contiguous to the free end of the back post 11. Alternatively, the outer periphery of the back post 11 includes at least one protrusion connected to the free end of the back post 11. The at least one protrusion partially surrounds the outer periphery of the back post 11. In an alternative embodiment, the outer periphery of the back post 11 is smooth and free of protrusions between the free end of the back post 11 and one of the positioning ribs 15 nearest to the free end of the back post 11.

Furthermore, the two positioning ribs 15a and 15b and the two guiding ribs 13a and 13b can have identical or different widths. The present invention is not limited in this regard. In this embodiment, one of the guiding ribs 13a most distant to the free end of the back post 11 has a width larger than a width of each of the remaining guiding ribs 13b. The stop rib 16 may include at least one notch 17, such as two notches 17. Each notch 17 is aligned with a respective notch 14 of a respective guiding rib 13 nearest to the stop rib 16 in an axial direction of the back post 11.

The at least one crimp sleeve 2 can be a metal sleeve made of aluminum, coper, lead or alloys thereof. The present invention is not limited in this regard. The at least one crimp sleeve 2 is disposed around the back post 11 and covers the at least one notch 14.

In this embodiment, the number of the at least one crimp sleeve 2 is preferably two. The notch 14 of one of the guiding ribs 13 is covered by one of the two crimp sleeves 2. The notch 14 of another of the guiding ribs 13 is covered by another of the two crimp sleeves 2. For ease of explanation, the two crimp sleeves 2 are referred to as "crimp sleeve 2a" and "crimp sleeve 2b", respectively. Each of the two crimp sleeves 2a and 2b has a length L which permits the two crimp sleeves 2a and 2b to cover a guiding rib 13 and a positioning rib 15, respectively. When disposed around the back post 11 at the same time, the two crimp sleeves 2a and 2b cover all of the guiding ribs 13 and the positioning ribs 15. Each of the two crimp sleeves 2a and 2b is applied with a crimping pressure from the outer periphery towards a central axis of a respective crimp sleeve 2a, 2b to reduce the diametric sizes of the respective crimp sleeve 2a, 2b. Thus, the two crimp sleeves 2a and 2b can be crimped to the back post 11 and are stopped by the stop rib 16, preventing the two crimp sleeves 2a and 2b from falling off from the free end of the back post 11. Particularly, in an alternative embodiment, only one crimp sleeve 2 is provided and preferably has a length larger than the above length L, such that the crimp sleeve 2 can simultaneously cover all of the guiding ribs 13 and the positioning ribs 15.

Figure 3:
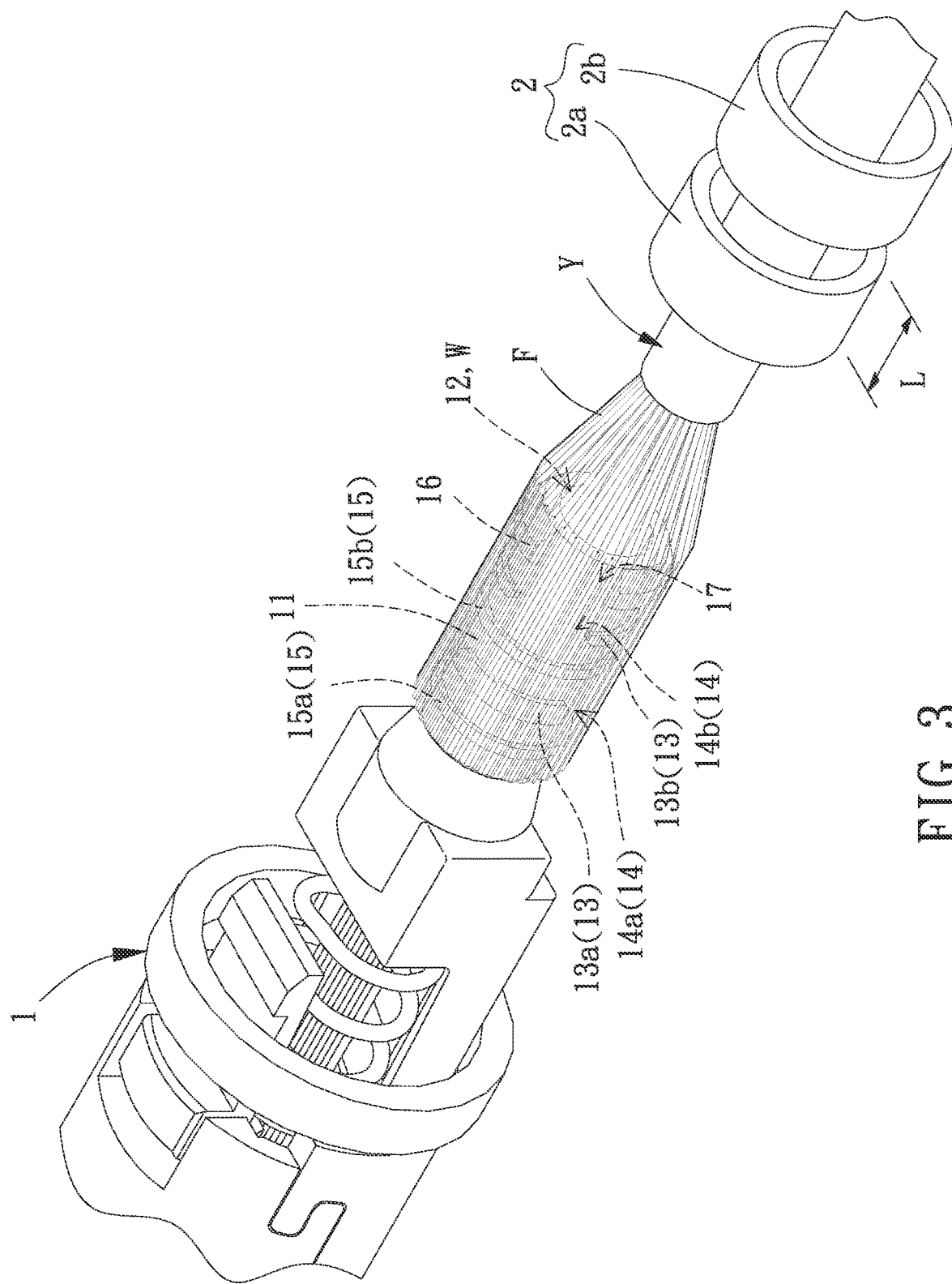
FIG. 3 is a perspective view of the crimping device of the preferred embodiment according to the present invention, with reinforced fibers covering a back post.

With reference to FIGS. 2 and 3, a crimping device for reinforced fibers according to the present invention can be used to carry out a crimping method for reinforced fibers. The crimping method comprises the following steps.

An optical fiber cable Y and the above connector 1 are provided. The optical fiber cable Y can be any conventional optical fiber cable. The present invention is not limited in this regard. The optical fiber cable Y includes at least one optical fiber W and a plurality of reinforced fibers F. The at least one optical fiber W can be made of glass or polymers, such as plastic, silicon dioxide, fluorozirconate glass, fluoroaluminate glass, chalcogenide glass, or sapphire, which has a low refractivity. In this embodiment, the optical fiber cable Y can include, but not limited to, a plurality of optical fibers W. The plurality of reinforced fibers F surrounds the plurality of optical fibers W and reinforces the tensile strength of the optical fiber cable Y. The plurality of reinforced fibers F can be made of metal, such as copper, aluminum, steel, etc. Alternatively, the plurality of reinforced fibers F can be made of non-metal material, such as S-glass fiber, aramid fiber, carbon fiber, Kevlar fiber, etc.

The optical fiber cable Y extends through at least one crimp sleeve 2. In this embodiment, the optical fiber cable Y extends through the crimp sleeve 2b and the crimp sleeve 2a in sequence. Furthermore, the plurality of optical fibers W extends through the back post 11 of the connector 1. More specifically, the plurality of optical fibers W extends through the through-hole 12 via the free end of the back post 11. Thus, end faces of the plurality of optical fibers W can be positioned to the connector 1 for signal transmission.

With reference to FIG. 3, next, the outer periphery of the back post 11 is covered by the plurality of reinforced fibers F. In this embodiment, the plurality of reinforced fibers F covers the two guiding ribs 13a and 13b, the two positioning ribs 15a and 15b, and the stop rib 16, and the back post 11 is located between the plurality of optical fibers W and the plurality of reinforced fibers F.

Figure 4:
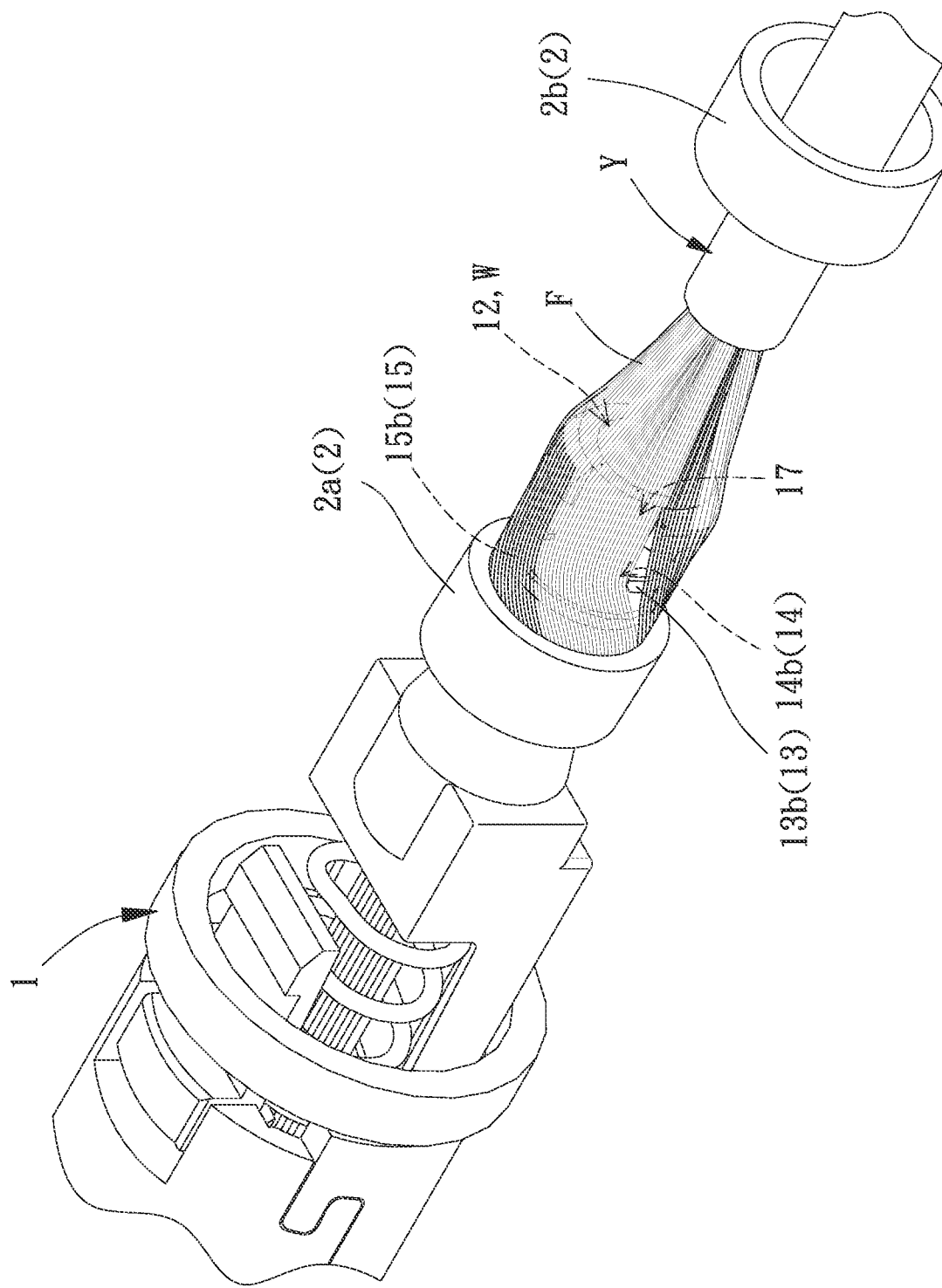
FIG. 4 is a perspective view of the crimping device of the preferred embodiment according to the present invention, illustrating the reinforced fibers after twisting.

With reference to FIGS. 3 and 4, then, the plurality of reinforced fibers F is crimped to a front section of the back post 11. In this embodiment, the at least one crimp sleeve 2 of the crimping device is used to crimp the plurality of reinforced fibers F. Thus, the at least one crimp sleeve 2 can be moved along the plurality of optical fiber cable Y towards the back post 11. In an embodiment using two crimp sleeves 2a and 2b, the crimp sleeve 2a adjacent to the back post 11 is firstly moved to a position around the front section of the back post 11 and covers the positioning rib 15a and the guiding rib 13a. Then, a crimping pressure is applied from the outer periphery of the crimp sleeve 2a towards a central axis of the crimp sleeve 2a, such that the crimp sleeve 2a can crimp the plurality of reinforced fibers F to the positioning rib 15a and the guiding rib 13a. Since the positioning rib 15a completely surrounds the outer periphery of the back post 11, the crimp sleeve 2a can crimp all reinforced forces F to the positioning rib 15a to improve the securing effect of the plurality of reinforced fibers F, such that the plurality of reinforced fibers F is less likely to disengage from the back post 11. Furthermore, the guiding rib 13a can have a larger width to increase the crimping area of the crimp sleeve 2a, thereby improving the crimping reliability of the front section of the plurality of reinforced fibers F by the crimp sleeve 2a. Preferably, in the circumferential direction of the back post 11, about 50% of the plurality of reinforced fibers F can be gathered in two notches 14a of the guiding rib 13a.

Then, the plurality of reinforced fibers F is twisted in the circumferential direction of the back post 11, such that the plurality of reinforced fibers F extends on the outer periphery of the back post 11 in a non-axial direction. The twisting direction can be clockwise or counterclockwise. The present invention is not limited in this regard. In this embodiment, the plurality of reinforced fibers F is twisted clockwise in the circumferential direction of the back post 11, and the twisting angle is not limited in the present invention. In this embodiment, the two notches 14a of the guiding rib 13a are spaced from the two notches 14b of the guiding rib 13b by 90° in the circumferential direction of the back post 11. Thus, with the back post 11 having a limited length, the plurality of reinforced fibers F can extend in the non-axial direction by twisting the plurality of reinforced fibers F 90° in the circumferential direction of the back post 11, which is a preferred arrangement. Furthermore, the plurality of reinforced fibers F gathered in the two notches 14a is further gathered in the two notches 14b. The two notches 14a and the two notches 14b can avoid slippage of the plurality of reinforced fibers F gathered therein. As a result, by guidance of the two notches 14a and the two notches 14b having different angular positions, the plurality of reinforced fibers F can be easily retained in the non-axially extending state on the outer periphery of the back post 11

Figure 5:
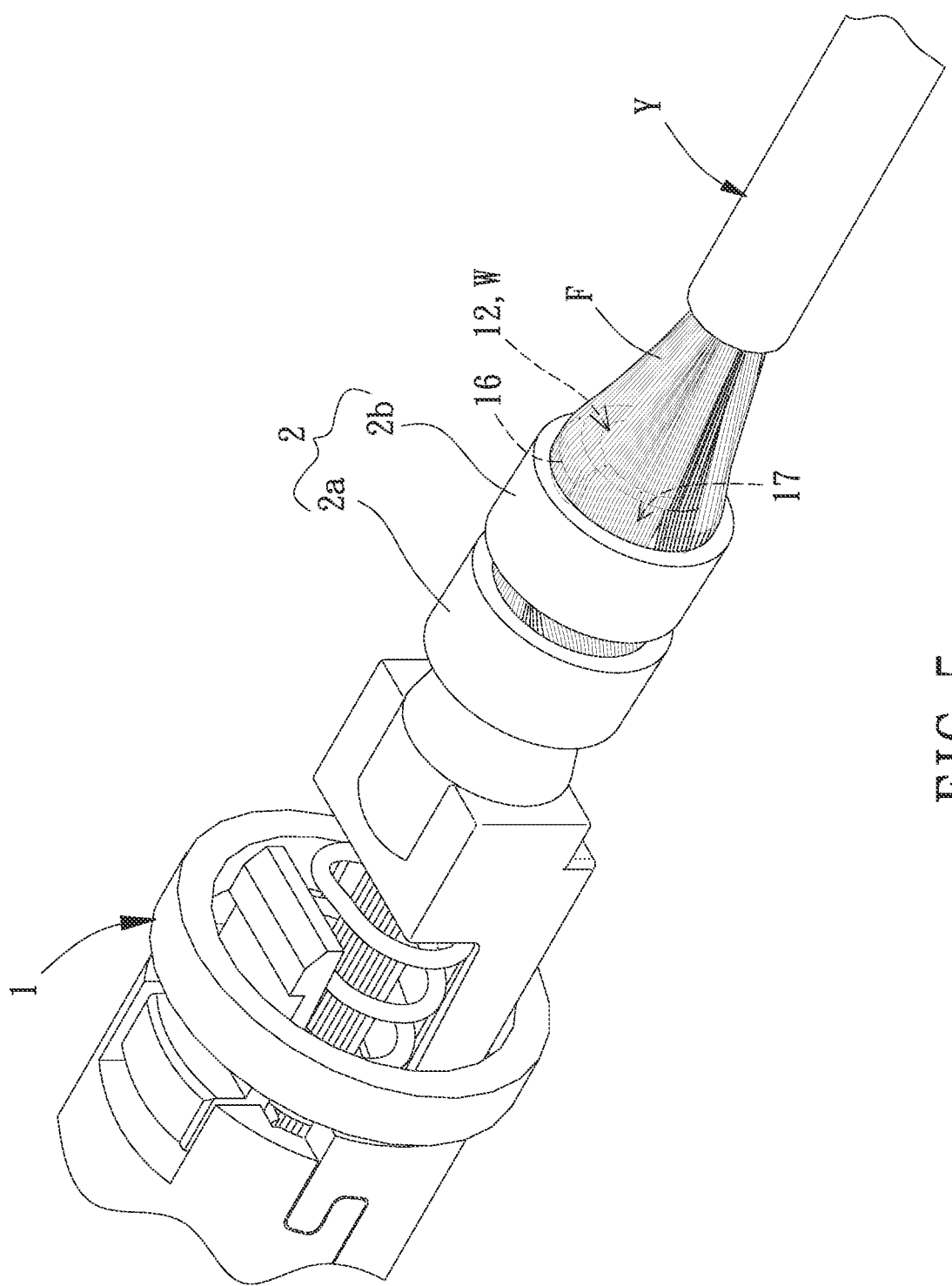
FIG. 5 is a perspective view of the crimping device of the preferred embodiment according to the present invention, illustrating the reinforced fibers in a crimped state.

With reference to FIGS. 3 and 5, finally, the plurality of twisted reinforced fibers F is crimped to a rear section of the back post 11. In this embodiment, the crimp sleeve 2b is moved towards the back post 11, such that the crimp sleeve 2b is disposed around the rear section of the back post 11 and covers the positioning rib 15b and the guiding rib 13b at the rear section. Then, a crimping pressure is applied from the outer periphery of the crimp sleeve 2b towards a central axis of the crimp sleeve 2b, such that the crimp sleeve 2b can crimp the plurality of twisted reinforced fibers F to the positioning rib 15b and the guiding rib 13b. Thus, the plurality of twisted reinforced fibers F can be secured in position.

Since the plurality of reinforced fibers F extends non-axially on the outer periphery of the back post 11, the axial tensile force acting between the connector 1 and the optical fiber cable Y can be distributed. Thus, by using the crimping method according to the present invention, the maximum axial tensile force withstandable between the connector 1 and the optical fiber cable Y can be up to 454 N. Furthermore, since the two notches 14a and the two notches 14b of this embodiment are diametrically opposed to each other in the diametric direction of the back post 11, the plurality of reinforced fibers F can be symmetrically gathered in the two notches 14a and the two notches 14b. This can symmetrically distribute the axial tensile force while providing uniform load distribution. Furthermore, the stop rib 16 may have a larger height, such that the stop rib 16 can stop the crimp sleeve 2b after crimping, avoiding disengagement of the crimp sleeve 2b. Furthermore, since the two notches 17 of the stop rib 16 can be aligned with the two notches 14b of the guiding rib 13b in the axial direction of the back post 11, the plurality of reinforced fibers F gathered in the two notches 14b can extend straight through the two notches 17 of the stop rib 16, such that the plurality of reinforced fibers F gathered in the two notches 17 can avoid breakage resulting from shear force caused by the crimp sleeve 2b and the stop rib 16. In a case that the outer periphery of the back post 11 between the free end of the back post 11 and the guiding rib 13b is free of the stop rib 16 and is smooth without any protrusions, the plurality of reinforced fibers F can extend without interference to reduce the possibility of breakage.

In another embodiment including only one crimp sleeve 2, a user can only crimp the front section of the crimp sleeve 2, such that the front section of the crimp sleeve 2 crimps the plurality of reinforced fibers F to the guiding rib 13a and the positioning rib 15a. Then, after twisting of the plurality of reinforced fibers F, a pressure is applied to the rear section of the crimp sleeve 2, such that the rear section of the crimp sleeve 2 crimps the plurality of reinforced fibers F to the guiding rib 13b and the positioning rib 15b. Thus, a single crimp sleeve 2 is sufficient to fix the plurality of reinforced fibers F and to make the plurality of reinforced fibers F extend non-axially on the outer periphery of the back post 11.

Figure 6:
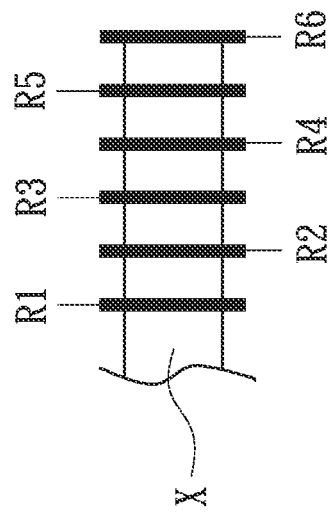
FIG. 6 is an elevational view of a back post used for axial tensile tests on Kevlar fibers.
Figure 7:
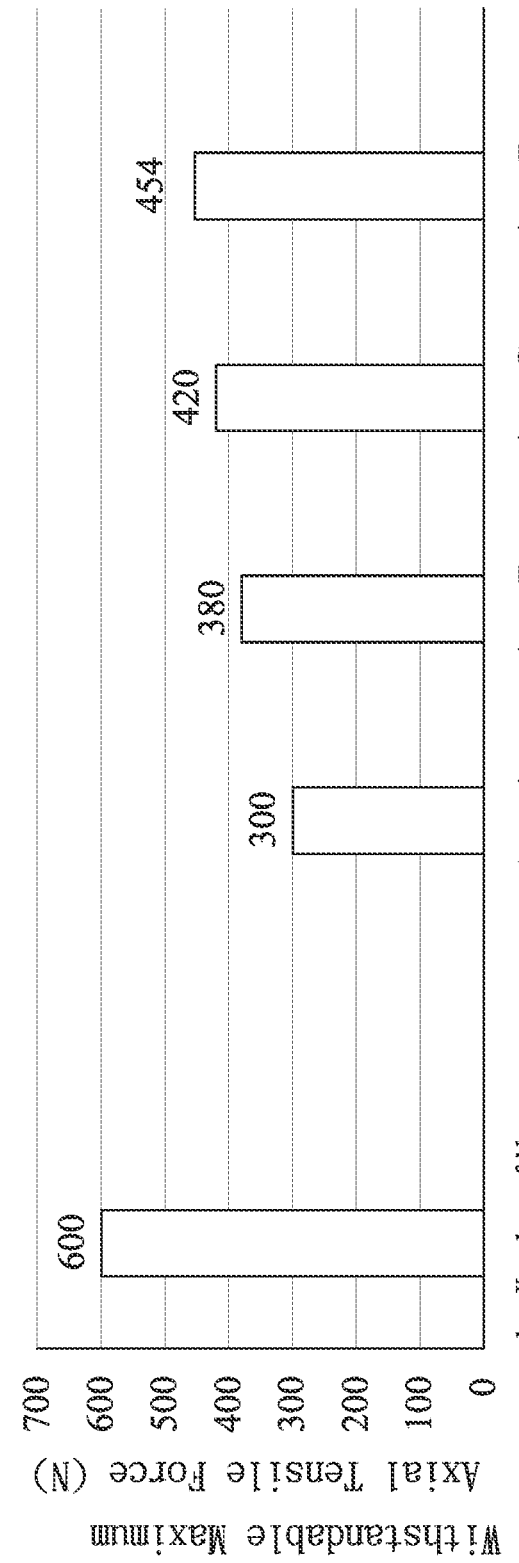
FIG. 7 is a chart illustrating the maximum axial tensile force withstandable by the Kevlar fibers.

FIGS. 6 and 7 show experiment results of the maximum axial tensile force withstandable by Kevlar fibers crimped by the crimping method for reinforced fibers according to the present invention carried on back posts X of different types (see FIG. 6). In this experiment, the outer periphery of the back post X includes six ribs which could be any combination of the guiding ribs 13, the positioning ribs 15, and the stop rib 16. The six ribs are designated R1-R6 in sequence from the fixed end of the back post X to the free end of the back post X. The maximum axial tensile force withstandable by the Kevlar fibers per se is about 600 N. Five types of back posts X are used in this experiment. After the Kevlar fibers are crimped to the back posts X of four different types, the corresponding withstandable maximum axial tensile forces thereof are shown in Table 1 below. As can be seen from Table 1 and FIG. 7, the crimping method enables the Kevlar fibers to withstand an axial tensile force of at least 300 N. The maximum axial tensile force withstandable by the Kevlar fibers can be 454 N when the crimping device for reinforced fibers according to the present invention is used.

TABLE 1

Maximum axial tensile force withstandable by Kevlar fibers crimped to back post of different types

| type | Structure of back post X | Withstandable maximum axial tensile force (N) |
| --- | --- | --- |
| A | Ribs R1-R6 are annular and tree of notches. | 300 |
| B | Each of ribs R1, R3, R5, and R6 has two notches spaced from each other by 90°, and ribs R2 and R4 are annular and free of notches. | 380 |
| C | Each of ribs R1, R3, and R5 has two notches spaced from each other by 90°, rib R6 has two notches spaced from each other by 120°, and ribs R2 and R4 are annular and free of notches. | 420 |
| D | Each of ribs R1 and R3 has two notches spaced from each other by 90°, rib R5 has two notches spaced from each other by 120°, and ribs R2 and R4 are annular and free of notches. Back post X does not include rib R6. | 454 |

In view of the foregoing, by using the crimping device and the crimping method for reinforced fibers according to the present invention, the plurality of reinforced fibers can extend non-axially on the outer periphery of the back post, and a portion of the plurality of reinforced fibers can be gathered in the at least one notch to provide more secure crimping. Thus, the axial tensile force acting on the connector and the optical fiber cable can be effectively distributed, thereby increasing the withstanding capacity of the axial tensile force between the connector and the optical fiber cable. It is worth noting that the crimping method for reinforced fibers according to the present invention can be carried out by devices other than the above crimping device. Namely, other equivalent structures can be used to carry out the crimping method.

Although the invention has been described in detail with reference to its presently preferable embodiments, it will be understood by one of ordinary skill in the art that various modifications can be made without departing from the scope of the invention, as set forth in the appended claims.

What is claimed is:

1. A crimping method for reinforced fibers, comprising:
providing an optical fiber cable and a connector, wherein the optical fiber cable includes a plurality of reinforced fibers, wherein the connector includes a back post having an outer periphery, wherein two guiding ribs protrude outward from the outer periphery of the back post, and wherein two notches are respectively recessed from a topmost end of the two guiding ribs toward the outer periphery of the back post in a radial direction and are misaligned from each other in an axial direction;
arranging the plurality of reinforced fibers around the two guiding ribs and the outer periphery of the back post by twisting the plurality of reinforced fibers in a circumferential direction of the back post, such that a portion of the plurality of reinforced fibers extends on the outer periphery of the back post and extends through the two notches in a non-axial direction; and
crimping the plurality of reinforced fibers to the back post.

2. The crimping method for reinforced fibers as claimed in claim 1, wherein the plurality of reinforced fibers is twisted 90° in the circumferential direction of the back post.

3. A crimping device for reinforced fibers, comprising:
a connector including a back post on an end thereof, wherein the back post includes an outer periphery having two guiding ribs protruding outward from the outer periphery of the back post, and wherein two notches are respectively recessed from a topmost end of a respective one of the two guiding ribs toward the outer periphery of the back post in a radial direction and are misaligned from each other in an axial direction; and
at least one crimp sleeve disposed around the back post and covering the two guiding ribs and the two notches, wherein the at least one crimp sleeve is configured to crimp a portion of a plurality of reinforced fibers of an optical fiber cable onto the two guiding ribs, and wherein another portion of the plurality of reinforced fibers is arranged on the outer periphery of the back post and extends through the two notches.

4. The crimping device for reinforced fibers as claimed in claim 3, wherein the two of the plurality of notches located in the two different guiding ribs are spaced from each other by 90° in the circumferential direction of the back post.

5. The crimping device for reinforced fibers as claimed in claim 3, wherein the at least one crimp sleeve includes two crimp sleeves, wherein one of the two of the plurality of notches in one of the two different guiding ribs is covered by one of the two crimp sleeves, and wherein another of the two of the plurality of notches in another of the two different guiding ribs is covered by another of the two crimp sleeves.

6. The crimping device for reinforced fibers as claimed in claim 3, wherein in an axial direction of the back post, one of the two guiding ribs most distant to a free end of the back post has a width larger than a width of another one of the two guiding ribs.

7. The crimping device for reinforced fibers as claimed in claim 3, wherein each of the two guiding ribs includes two notches opposite to each other in a diametric direction of the back post.

8. The crimping device for reinforced fibers as claimed in claim 3, wherein the outer periphery of the back post is smooth and free of protrusions between a free end of the back post and one of the at least one two guiding ribs nearest to the free end of the back post.

9. The crimping device for reinforced fibers as claimed in claim 3, wherein the back post includes at least one positioning rib protruding outward from a section of the outer periphery of the back post to form a closed shape enclosing the section correspondingly.

10. The crimping device for reinforced fibers as claimed in claim 9, wherein the at least one positioning rib includes a plurality of positioning ribs, and wherein each two adjacent positioning ribs have a respective one of the guiding ribs therebetween.

11. The crimping device for reinforced fibers as claimed in claim 9, wherein the outer periphery of the back post is smooth and free of protrusions between a free end of the back post and the at least one positioning rib nearest to the free end of the back post.

12. The crimping device for reinforced fibers as claimed in claim 3, wherein the back post includes a stop rib contiguous to a free end of the back post, and wherein the at least one crimp sleeve is stopped by the stop rib after crimping the plurality of reinforced fibers.

13. The crimping device for reinforced fibers as claimed in claim 12, wherein the stop rib includes a notch aligned with the notch of one of the two guiding ribs nearest to the stop rib in an axial direction of the back post.

14. The crimping device for reinforced fibers as claimed in claim 3, wherein the outer periphery of the back post includes at least one protrusion connected to a free end of the back post, wherein the at least one protrusion partially surrounds the outer periphery of the back post, and wherein the at least one crimp sleeve is stopped by the protrusion after crimping the plurality of reinforced fibers.

* * * * *